March 8, 1932.    W. R. G. BAKER    1,848,866
POLYPHASE RADIOFREQUENCY SYSTEM
Filed April 18, 1925

Inventor:
Walter R. G. Baker,
by *Alexander S. [signature]*
His Attorney.

Patented Mar. 8, 1932

1,848,866

UNITED STATES PATENT OFFICE

WALTER R. G. BAKER, OF SCHENECTADY, NEW YORK, ASSIGNOR TO GENERAL ELECTRIC COMPANY, A CORPORATION OF NEW YORK

POLYPHASE RADIOFREQUENCY SYSTEM

Application filed April 18, 1925. Serial No. 24,228.

My present invention relates to carrier current systems, and more particularly to means for supplying polyphase carrier currents to a polyphase system of power distribution.

In carrier current broadcasting, to which the present invention relates, it is, of course, desirable that each phase of any polyphase distribution system employed, should be energized at one time so that all equipment connected to the system may be supplied irrespective of the phase to which it may be connected. At the present time, when polyphase distribution systems are employed as carrier current systems, the radio frequency energy is not directly supplied at one time to each phase of the distribution system. For instance, in a three-phase system of distribution carrier current is supplied to but one phase, and the other two phases receive only what energy may be induced in them or whatever energy may leak from the phase supplied. A further advantage of supplying carrier frequency to each phase of a three-phase system of distribution resides in the fact that in such a system, if the wires are properly arranged and the currents in each wire 120° out of phase, the external field is practically zero so that interference in receivers associated with the system is reduced to a minimum.

It is the object of my invention to provide in a carrier current system, means whereby radio frequency energy may be simultaneously supplied to each phase of an alternating current polyphase distribution system.

Figure 1:
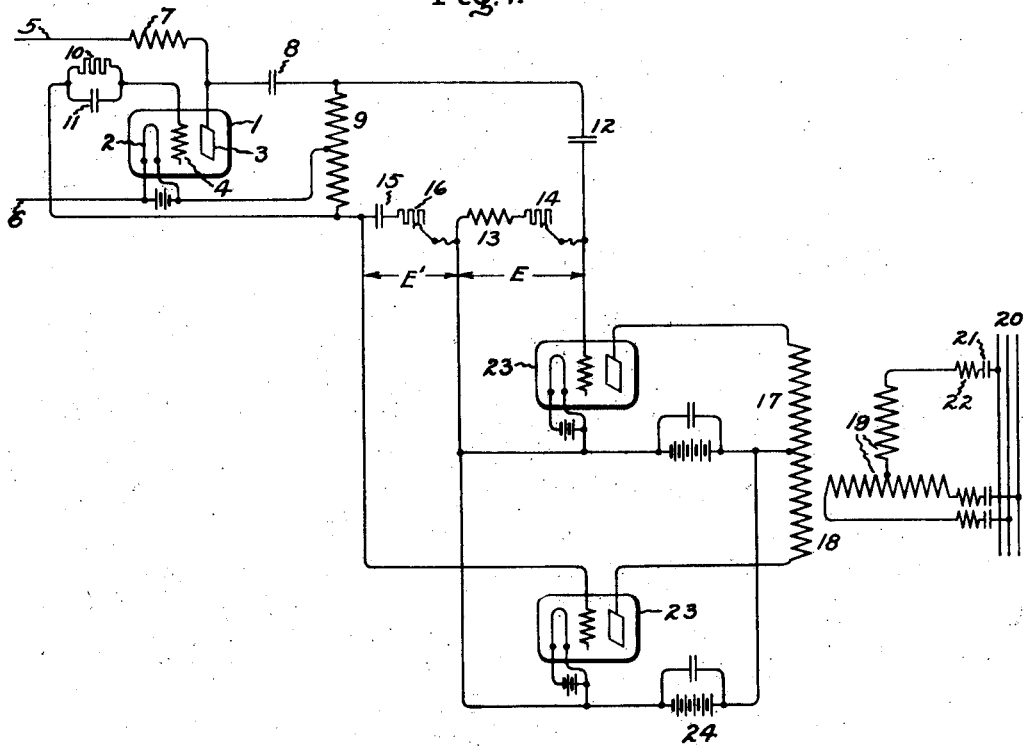
Figure 2:
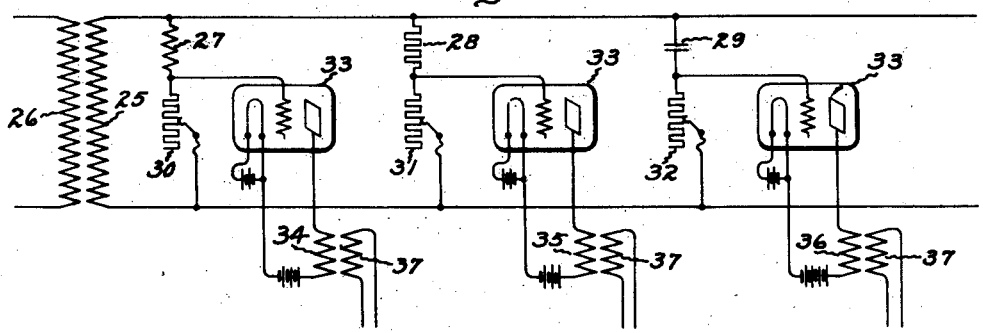

The novel features which I believe to be characteristic of my invention are set forth with particularity in the appended claims. My invention itself, however, both as to its organization and method of operation will best be understood by reference to the following description taken in connection with the accompanying drawings in which Fig. 1 shows diagrammatically one way in which single phase radio frequency energy may be converted to three phase and simultaneously supplied to each phase of a three phase system of distribution. Fig. 2 shows diagrammatically a second arrangement whereby single phase radio frequency energy may be converted to three phase radio frequency energy.

Referring to the drawings, I have indicated at 1 a master oscillator or transmitter comprising a three electrode electron discharge device of the thermionic type which is employed for the purpose of producing high frequency oscillations. Transmitter 1 comprises the usual cathode 2, anode 3 and grid 4. Current for the operation of the anode or plate circuits is furnished by a source of high potential connected to the supply conductors 5 and 6. The positive terminal is connected to the anode 3 through a choking inductance 7 which prevents the high frequency currents produced in the system from flowing through the source of supply. The anode 3 is connected through a blocking condenser 8 and a portion of inductance 9 to the cathode 2. The grid 4 is connected to inductance 9 through the usual grid leak 10 and grid condenser 11. A condenser 12 is connected in shunt with inductance 9. Condenser 12 in conjunction with coil 9 forms an oscillating output circuit which determines the frequency of the single phase electromotive force produced by device 1.

A plurality of variable impedance devices comprising respectively an inductance 13 and variable resistance 14, and a condenser 15 and variable resistance 16 are connected in circuit with inductance 9 and condenser 12, and are employed for obtaining proper phase displacement in a plurality of primary transformer windings 17 and 18. The primary windings are inductively related to a secondary three phase winding 19 which is connected to the three phase distribution system 20 by means of blocking condensers 21 and choke coils 22. The particular arrangement of transformer windings shown is known as the Scott transformer. A three electrode electron discharge device 23, supplied by a high voltage source 24, is connected between each primary winding, and one of the variable impedances, and serves to amplify the energy supplied by the oscillating output circuit of transmitter 1 to the primary windings 17 and 18 and at the same time, prevents the impedance of the distribution system from affecting the adjustment of the impedance elements, that is, the impedance elements are rendered substantially independent of the load impedance. While, in the interest of clearness, separate sources of direct current high voltage are shown connected to the oscillation generator 1 and amplifiers 23, in actual operation a single source of high voltage would be employed to supply the three tubes.

In the operation of the device shown, single phase high frequency current is supplied to the output circuit of the oscillation generator or transmitter 1. Theoretically, in a no-loss circuit the vectors representing electromotive forces E and E' would be equal and opposite. However, when a loss, such as indicated by resistances 14 or 16 is introduced in circuit with inductance 13 or condenser 15, these vectors will be rotated, and if sufficient loss were introduced the vectors representing E and E' would differ in phase by 90°. In this manner quarter phase currents may be supplied to windings 17 and 18 which will be converted to three phase energy by the secondary winding 19 and simultaneously supplied to each phase of the distribution system 20.

The arrangement shown in Fig. 2 is similar in operation to that shown in Fig. 1. Single phase high frequency energy is supplied to winding 25 by a winding 26. Three variable impedance elements comprising respectively an inductance 27, a resistance 28 and a condenser 29 are connected in the output circuit of winding 25 and variable resistors 30, 31 and 32 are included in circuit with the different impedance elements. A three element electron discharge device 33 is associated with each variable impedance. Windings 34, 35 and 36 which comprise the primary windings of a transformer, are connected in the output circuits of the discharge devices. The grid of each discharge device is connected to its associated variable impedance. By varying resistors 30, 31 and 32, the phase of the electromotive force in each of windings 34, 35 and 36 may be controlled so that a three phase electromotive force may be induced in the secondary windings 37. The latter may be connected to a three phase system of distribution as in Fig. 1.

While I have shown and described but two modifications of my invention it will be apparent that many modifications in the circuit arrangement may be employed without departing from the scope of my invention as set forth in the appended claims.

What I claim as new and desire to secure by Letters Patent of the United States, is:

1. In combination, a single phase source of high frequency power, a plurality of primary transformer windings, a secondary winding inductively related to said primary windings, a plurality of electron discharge devices, each of said discharge devices being connected between said single phase source and one of said primary windings and means associated with said single phase source of power for controlling the phase relation of electromotive forces in said primary windings.

2. In combination, a single phase oscillation generator, having an output circuit, impedance means connected in circuit with said single phase oscillation generator for producing electromotive forces which are displaced in phase, transforming means having a plurality of primary windings and a plurality of secondary windings, an electron discharge device connected between each of said primary windings and said impedance means whereby polyphase electromotive forces are produced in said secondary windings and said impedance means is rendered substantially independent of the load on said secondary windings.

3. In combination, a single phase oscillation generator, having an output circuit, transforming means having a pair of primary windings, a connection in shunt with said output circuit, a connection from an intermediate point on said shunt connection to one terminal of both of said primary windings and a connection from opposite terminals on said primary windings to the opposite terminals of said output circuit, phase changing means in said shunt connection on opposite sides of said intermediate point, whereby electromotive forces displaced in phase by substantially ninety degrees are produced on said windings, and means included in said transforming means for producing polyphase electromotive forces the instantaneous sum of which is substantially zero.

In witness whereof, I have hereunto set my hand this 17th day of April, 1925.

WALTER R. G. BAKER.